(12) United States Patent
Kresser (10) Patent No.: US 9,706,129 B2
(45) Date of Patent: Jul. 11, 2017

(54) IMAGE RECORDING METHOD HAVING ADAPTIVE MARKING LIGHT EMISSION AND SUCH AN IMAGE RECORDING DEVICE

(71) Applicant: WolfVision Innovation GmbH, Klaus (AT)

(72) Inventor: Clemens Kresser, Horbranz (AT)

(*) Notice: Subject to any disclaimer, the term of this patent is extended or adjusted under 35 U.S.C. 154(b) by 148 days.

(21) Appl. No.: 14/609,837

(22) Filed: Jan. 30, 2015

(65) Prior Publication Data

US 2015/0222801 A1 Aug. 6, 2015

(30) Foreign Application Priority Data

Jan. 31, 2014 (EP) .................................. 14153489

(51) Int. Cl.
*H04N 5/235* (2006.01)
*G03B 17/54* (2006.01)
*H04N 5/225* (2006.01)
*H04N 1/38* (2006.01)
*H04N 1/195* (2006.01)

(52) U.S. Cl.
CPC ........... *H04N 5/2354* (2013.01); *G03B 17/54* (2013.01); *H04N 1/195* (2013.01); *H04N 1/38* (2013.01); *H04N 5/2256* (2013.01); *H04N 2201/0436* (2013.01); *H04N 2201/0452* (2013.01)

(58) Field of Classification Search
CPC ....... H04N 1/195–1/19594; H04N 2201/0452; H04N 5/2256; G03B 17/54
See application file for complete search history.

(56) References Cited

U.S. PATENT DOCUMENTS 5,194,729 A 3/1993 Okisu et al.
6,320,641 B1 * 11/2001 Bauer ................ G01N 21/8806
348/E5.029

* cited by examiner

*Primary Examiner* — Paul Berardesca
(74) *Attorney, Agent, or Firm* — Muncy, Geissler, Olds & Lowe, P.C.

(57) ABSTRACT

An image recording method is disclosed. The image recording device has a camera having an image sensor and an objective lens, wherein the camera defines an image recording region, and the image sensor has a capture area having a plurality of image pixels which can be activated and read out in pixel groups, and a marking unit having a light source. The emission of the marking light is performed such that a visually perceptible light marking is generated inside the image recording region, and is performed in a predetermined manner to generate light marking within a light incidence region, which forms a subregion of the image recording region and the image capture is performed using chronologically offset collection, pixel group by pixel group, of exposure information, wherein the emission of the marking light is interrupted for the collection of the exposure information for each pixel group.

15 Claims, 5 Drawing Sheets

Fig. 6

IMAGE RECORDING METHOD HAVING ADAPTIVE MARKING LIGHT EMISSION AND SUCH AN IMAGE RECORDING DEVICE

This application claims priority to European Patent Application No.: 14153489.1, which was filed in Europe on Jan. 31, 2014, and which is herein incorporated by reference in its entirety.

The invention relates to an image recording method for image capture of an object using an image recording device according to the preamble of claim 1, a corresponding image recording device for capturing an image according to the preamble of claim 11, and a computer program product for controlling or executing the image recording method according to claim 15.

In the scope of such an image capture, the objects which can be captured or are to be captured therewith are to be understood in this case in particular both as two-dimensional objects in the form of optical information carriers such as images in the conventional meaning, for example, drawings, photographs, slides, and x-ray pictures, pages of text, documents, presentation slides, and also as three-dimensional objects, for example, models, components, books, and living or dead bodies or body parts, including a possible background or surrounding of the respective actual object.

Known image recording devices of the type in question of the prior art (so-called "visualizers") typically comprise a (video) camera, which can be aligned on a region which at least partially contains the object to be recorded, having an objective lens—which can be focused and zoomed in particular—optionally a mirror system for deflecting the beam path from the objective lens into the video camera, and usually a light source for illuminating the object. In the case of most known devices, the region is part of the device itself and is formed by a support surface for the placement of the object to be recorded. In other known embodiments, which are installed on the ceiling in particular, the region is formed, however, by any arbitrary surface, for example, a table or wall surface, an operating table, or the surface of an arbitrary living or dead object.

The image of the object or of the region is recorded by the camera and converted into an electrical signal in particular, which is supplied to an image display device, for example, a display screen, a monitor, or a projector, or an image processing device, in particular a computer. For example, the image display device enables a large number of spectators to observe a small object, which is placed by an operator of the image recording device on the support surface and on which interventions are carried out by the operator if needed.

An image recording device having a boundary display is described in DE 102 04 660 A1. The image recording device has an image sensor, a cone, a retaining arm, a base, and a boundary display. The image sensor is located in the cone and is used to record an image of an object and to generate a corresponding image signal. The retaining arm connects the cone to the base. The boundary display comprises at least one—preferably four—lamps, in particular laser lamps, in the edge of the cone to emit light, which identifies the image recording region of the image recording device directly on the object. It is therefore no longer necessary for the user to look into a monitor, which displays the recorded image, to place and align the object in the image recording region. It is recognizable directly on the object where the image recording region is located. This is advantageous above all during lectures or presentations, during which the image display is not located in the immediate field of view of the lecturer, who is simultaneously operating the image recording device.

A separate monitor for the lecturer can therefore be omitted. Furthermore, substantially faster alignment of the object is possible. To enlarge or shrink the image, the distance between the object and the cone is increased or reduced by adjusting the retaining arm. Because of the lateral arrangement of the lamps on the cone adjacent to the image sensor and the beam paths thus separated, the reduction or increase of the distance results in a slight misplacement of the identification in relation to the image recording region, however. A further disadvantage of this embodiment is that the fixedly set boundary display makes it impossible to use an image sensor having zoom objective lens, since the fixed boundary display no longer corresponds to the image recording region in the event of change of the focal length.

EP 0 362 737 A1 describes a device for converting pictures or images into video signals. In this device, an adjustable first objective lens of a camera is oriented jointly with a light source, which has an adjustable second objective lens, via a mirror system on a projection area. The projection area can be located on the device or also adjacent thereto. The first objective lens of the camera is coupled in this case to the second objective lens of the light source such that congruency of the cross sections of the recording beam path and the illumination beam path results in the region of the projection area, whereby the light area is coincident with the recording area. Finding the region recorded by the camera is easily possible for an operator in this case, independently of the setting of the first objective lens of the camera, since due to coupling of the camera to the illumination, in particular of the first and second objective lenses, the recorded region clearly visibly corresponds to the region illuminated by the light source. Adaptation of the zoom setting to the size of the object to be recorded and also alignment of the object on the recording location or vice versa is therefore possible by orientation on the illuminated area, since the light source is simultaneously used as a boundary display. The beam paths of the illumination and the recording are separated with respect to the lens systems by way of the two objective lenses, to prevent scattered light effects and reflections, which would negatively influence the image quality. A disadvantage of this embodiment is the comparatively complex, large, and heavy construction of the device, since two adjustable objective lenses, which are coupled to one another, and a mirror system are required to create a long beam path between the two objective lenses, which are arranged at an angle between 1° to 5° adjacent to one another, to avoid shadow effects on the object.

CH 698 323 B1 discloses an image recording device having a camera, a marking unit for generating an optical marking, and a coupling unit for coupling the marking light into the beam path of the camera, so that both an image region which can be captured by the camera and also the beam guiding for the marking light are adaptable by means of an adjustment of the camera objective lens. For image capture by means of the image recording device, the image sensor is globally exposed and read out at a specific interval, wherein a sampling gap exists between respective exposure intervals and readout intervals.

Current visualizers of the type in question are to provide a high resolution (for example, full HD) with high image capture frequency at the same time (for example, 60 FPS). Since currently the above criteria can be fulfilled in particular using CMOS sensors, such sensors are typically used for the image capture using visualizers. Further requirements for the usable image sensors are the spatial requirement and the cost expenditure linked to providing them. CMOS sensors having a "global shutter", i.e., the image capture occurs simultaneously over the entire capture region of the sensor, are usually comparatively costly to purchase and often do not meet the given size requirements. In contrast, the cost and size conditions may be fulfilled using a CMOS sensor having "rolling shutter" (image capture offset in time over the capture area).

However, it results as a problem upon the use of a sensor having "rolling shutter" that the marking light generally cannot be turned off only for the duration of the image capture using the sensor, since the image capture takes place continuously and thus a marking would no longer be visible. A chronological image capture gap, in which the light could be emitted without also capturing it in the image, is no longer provided in this case.

The object of the present invention is therefore to provide an improved image recording device and an improved image capture method for image recording, in the case of which image capture takes place with improved resolution and capture rate, a marking is available for a respective image capture region, and simultaneously this marking is not visible in a resulting image.

A further object of the invention is to provide such a device or method, wherein the cost expenditure linked to the image capture, in particular with regard to the image sensor, is small in comparison to systems of the type in question.

This object is achieved by the implementation of the characterizing features of the independent claims. Features which refine the invention in an alternative or advantageous manner can be inferred from the dependent patent claims.

The invention relates to an image recording method for image capture using an image recording device. The image recording device has a camera having an image sensor and an objective lens, wherein the camera defines an image recording region, which can be captured in an image and can be set at least by means of the objective lens, and the image sensor has a capture area having a plurality of image pixels for image capture and the image pixels can be activated and read out in pixel groups. The objective lens of the camera is implemented as a zoom objective lens, for example, and thus provides a variable field of vision of the camera and an image recording region, which is also variable, on a surface. The image recording region is accordingly imaged by means of the objective lens on the image sensor. In addition, the image recording device has a marking unit having a light source for emitting marking light.

In the scope of the image recording method, emission of the marking light is performed such that a visually perceptible light marking is generated within the image recording region, and an image capture of the image recording region is performed by means of the camera.

By way of the light marking thus generated on a surface or on an object to be captured in the image, a user of the image recording device can place the object in relation to or in the image recording region such that an image which is then captured images the object or a detail thereof in a desired manner. The marking unit has, for example, a number of laser diodes and at least one beam-shaping optic and enables the generation of one or more light spots or patterns.

According to the invention, the emission of the marking light is performed in a predetermined manner such that the light marking is generated within a light incidence region, which is assigned thereto and forms a subregion of the image recording region, and the light incidence region can be captured by a subset of known sub-image pixels from the plurality of image pixels. The image capture is performed in this case using collection of exposure information, which is chronologically offset in groups of pixels, wherein for the collection of the exposure information for each pixel group, which comprises at least one sub-image pixel, the emission of the marking light is adapted, in particular interrupted.

The pixels of the image sensor can be electronically activated, wherein each pixel can be individually activated or the pixels can be activated in specific groups. A pixel group is to be understood in the scope of the invention as a number (and arrangement) of image pixels of the image sensor, wherein a pixel group can also comprise only a single image pixel. By way of a corresponding activation of a pixel group, light can be collected using this group for a specific period of time and the light information embodied in this case by the light can be captured and collected as the exposure information. For this purpose, at least two, but preferably multiple pixel groups are defined.

Such a sequential image capture of an image using an image sensor is thus performed in principle according to the method of a "rolling shutter".

The pixel groups are preferably defined in this case so that the entirety of the pixel groups comprises all image pixels of the sensor, wherein each image pixel is assigned to at least one pixel group, but can also be assigned simultaneously to multiple groups, so that overlapping pixel groups are defined and an item of exposure information can be collected multiple times for at least specific parts of the image recording region.

The procedure of collecting the exposure information using such an image sensor is also referred to technically as exposure of the respective pixel group, wherein exposure does not refer to the actual incidence of light on the sensor, but rather solely to the electronically controlled information capture using the pixel group. It thus relates to electronically controlled exposure of a pixel group in the meaning of the collection of the exposure information.

Using image sensors according to the invention, images can therefore be captured in that the exposure information is collected pixel group by pixel group and for all pixel groups of the sensor (i.e., for the entire capture area of the sensor), this information is read out accordingly, and an image is generated from the image information which is read out. After the image information is read out or the image is actually generated, the exposure information for the respective pixel is erased, so that renewed collection of new exposure information can be performed. Erasing the exposure information is also performed by means of an electronic circuit.

By way of the present invention, an object can thus be captured using a "visualizer" (image capture device) in an image or an image sequence, in particular a (real-time) video stream, and the image signals which can be generated in this case are transmitted to an image output device (projector, display screen, etc.). The image capture is performed in this case without capturing the projected light marking, in that the marking is turned off or deflected, for example, in a manner adapted to the respective partial exposure of the image sensor. The manipulation of the light emission in this manner is adapted in particular to the chronologically offset exposure of individual pixel groups.

According to specific embodiments of the invention, the image recording method is performed such that for each pixel group, a specific exposure time is defined and the collection of the exposure information is performed in the scope of the respective exposure time. In this case, the collection of the exposure information is performed pixel group by pixel group, successively with chronologically successive exposure times, and/or pixel group by pixel group, chronologically overlapping with overlapping exposure times.

Thus, exposure is carried out successively pixel group by pixel group (electronically controlled exposure=collection of the exposure information) or a first group is exposed and during the exposure of this first group, a second group or multiple successive groups are already exposed. For example, more rapid generation of a resulting overall image can be implemented with a chronologically overlapping exposure.

In this context—but also considered alone, i.e., isolated therefrom—the collection of the exposure information and a readout of the exposure information collected in each case for respective pixel groups takes place according to the invention in the scope of a further embodiment within a shared time window, in particular simultaneously, in particular wherein the exposure information is collected during the readout, or chronologically offset, in particular chronologically adapted to one another, in particular synchronized.

Accordingly, for example, a collection of exposure information (for respective pixel groups) can firstly be performed alone and the readout of the information can be performed chronologically thereafter.

With regard to the division of the capture area of the image sensor, according to one specific embodiment of the invention, the pixel groups each represent a subarea of adjacent image pixels of the capture area. Such a subarea can be, for example, a geometric arrangement of image pixels, for example, in the form of a square or rectangle.

In the scope of the invention, the pixel groups in particular each represent a linear sequence of adjacent image pixels, in particular wherein each pixel group corresponds to at least one sensor line or at least one sensor column of the capture area. According to such an embodiment, the image capture, i.e., the collection of the exposure information (exposure) and in particular the readout, can thus be performed line by line or column by column. A greater quantity of image pixels is thus activated and analyzed simultaneously, which results in more rapid image generation corresponding to the overall capture region of the image sensor.

For the adapted activation of the marking light, it is compared in particular in this case whether the sensor line presently to be captured intersects a region affected by the marking light (light incidence region), i.e., whether a pixel of the line lies in this region, and the marking light is adapted or not depending thereon.

According to one specific embodiment of the invention, the light incidence region is established (or defined) such that the area of the light incidence region comprises between 5% and 60% of the area of the image recording region, in particular between 10 and 50%, in particular wherein the sub-image pixels embody between 5% and 60% of the image pixels of the capture area, in particular between 10% and 50%. An optimized size for the light incidence region can thus be determined, wherein, on the one hand, a sufficient amount of light, i.e., well perceptible by the user, is emitted onto the image recording region and, on the other hand, efficient image capture is achieved—with regard to the time requirement and the adaptation of the marking light necessary for this purpose.

With respect to the embodiment of the emission of the marking light, this is performed according to the invention in particular such that the light marking is generated as at least one light spot, in particular in the center of the image recording region, and/or as a light pattern, in particular as a line. For example, an optical frame can thus be projected, by which the image recording region, i.e., the region which is imaged on the image sensor, is displayed. Alternatively or additionally, specific reference points can be overlaid, on the basis of which a user of the system can be instructed for a desired orientation for an object to be captured.

According to the invention, for specific embodiments of the invention, a distance between the objective lens and an object to be captured of 0.3 m to 15 m, in particular of 0.4 m to 10 m is provided during the capture of the image recording region, in particular wherein focusing of the marking light is automatically tracked in dependence on the distance. For example, the image recording device can have an autofocus function, by means of which the objective lens is set or readjusted in an automatically controlled manner.

Furthermore, according to a further embodiment of the invention—additionally or alternatively—an adaptation of the emission direction of the marking light is performed in dependence on the distance, in particular such that the light marking is progressively generated at a desired position, in particular in an intersection point of the optical axis of the camera with the image recording region. The marking unit can be aligned accordingly (automatically) for this purpose, for example, or a mirror arrangement is provided in the marking unit, for example, by means of which the adaptation of the emission direction is implemented.

In particular, the capture of the image recording region is performed according to the invention repeatedly at a specific frequency, wherein the collection of the exposure information for the respective pixel groups is performed at the specific frequency in each case, in particular wherein the image recording region or the pixel groups are captured or read out 10-1000 times per second, in particular 30-60 times per second.

Furthermore, according to a further embodiment of the invention, the emission and/or the adaptation of the emission of the marking light are performed in a manner adapted to the collection of the exposure information for the pixel groups which comprise at least one sub-image pixel, in particular wherein the emission is performed in a pulsed manner, the light source is sequentially turned off, and/or the emission of the marking light is blocked or deflected.

According to one specific embodiment, an illumination of the capture area of the image sensor is performed successively and segmented in such a manner that in each case between 5% and 50%, in particular between 10% and 50% of the capture area is illuminated, in particular by means of an adjustable aperture unit, in particular wherein the successive illumination and the collection of the exposure information are adapted to one another, in particular synchronized. This illumination regulates the actual light incidence on the sensor and does not relate to the exposure—i.e., does not relate to the (electronically controlled) collection of exposure information—in the meaning of the invention.

The invention furthermore relates to an image recording device for capturing an image, having a camera having an image sensor and an objective lens, wherein the camera defines an image recording region, which can be captured in an image and can be set at least by means of the objective lens, and the image sensor has a capture area having a plurality of image pixels for image capture and the image pixels can be activated and read out in pixel groups. The image recording device additionally has a marking unit having a light source for generating a visually perceptible light marking within the image recording region by means of emission of marking light.

According to the invention, the marking unit is implemented and arranged such that the light marking which can be generated can be assigned at least one defined light incidence region in the image recording region and the light incidence region can be captured (in an image by means of the camera) by a subset of known sub-image pixels from the plurality of image pixels. The image recording device provides an image capture mode defined in that in the scope thereof, the image recording region can be captured in an image by a successive collection pixel group by pixel group of exposure information controlled such that, for the collection of the exposure information for each pixel group, which comprises at least one sub-image pixel, the light marking which can be generated is adaptable, in particular can be interrupted.

By executing the image capture mode, in particular in a manner controlled by a control unit of the image recording device, the image capture region can therefore be captured, in particular can be read out, in its entirety free of the light marking.

An image recording device according to the invention is embodied in particular by a so-called "visualizer", i.e., a system for capturing images of objects, wherein the captured images are provided in the form of image signals for an image output device. Such visualizers are mounted on ceilings, for example, and capture a region below the ceiling, for example, a table on which the object is placed.

According to a specific embodiment of an image recording device according to the invention, the marking unit is implemented and arranged such that a propagation axis of the emitted marking light lies in a plane, which is defined by an axis which is parallel, in particular coaxial, to the optical axis of the camera and intersects the light incidence region, and by a readout direction for the readout of the pixel groups, in particular by an extension direction of sensor lines or sensor columns of the capture area of the image sensor. Such an embodiment offers the advantage that in the event of a change of the distance between the image recording device and the object to be recorded and an offset caused in this case of the light marking in relation to the optical axis of the camera or the respective axis parallel thereto, this light marking is not also captured during a line by line or column by column exposure of the image sensor and a corresponding linear definition of the light incidence region independently of the present distance (since it is always turned off or deflected independently of its location).

According to an alternative embodiment of the invention, the marking unit and the camera are implemented and arranged such that the marking light which can be emitted is coupled into the beam path of the camera.

The image recording device according to the invention has, in one specific embodiment, multiple image sensors and in particular multiple objective lenses, wherein the image recording region can be captured by means of the multiple image sensors and one of the pixel groups is formed at least by a subregion of one of the multiple image sensors, in particular by at least one of the multiple image sensors.

According to further embodiments of the image recording device according to the invention, the marking unit has a settable beam-focusing optic for focusing the marking light, in particular in dependence on a distance between the camera and an object to be captured, and/or the light source is implemented as a laser light source, in particular a laser diode, in particular wherein the marking unit has two or more light sources.

According to a further embodiment of the image recording device according to the invention, the marking unit has settable beam deflection means for adapting an emission direction of the marking light, in particular wherein the emission direction is settable in dependence on the distance between the camera and the object to be captured, in particular automatically.

According to the invention, the marking unit furthermore has at least one of the following components:
 a laser unit based on a microsystem (MEMS),
 a projection element having a DLP element (digital light processing) and/or a DMD element (digital micromirror device) and/or an LCOS element (liquid crystal on silicon), and/or
 a thin-film transistor (TFT) or a liquid crystal display (LCD).

The invention additionally relates to a computer program product, which is stored on a machine-readable carrier, for controlling or executing an image recording method according to the invention, in particular when the computer program product is executed by means of a control unit of an image recording device according to the invention.

The method according to the invention and the device according to the invention will be described in greater detail hereafter, solely as examples, on the basis of specific exemplary embodiments which are schematically illustrated in the drawings, wherein further advantages of the invention will also be discussed. In the specific figures.

Figure 1:
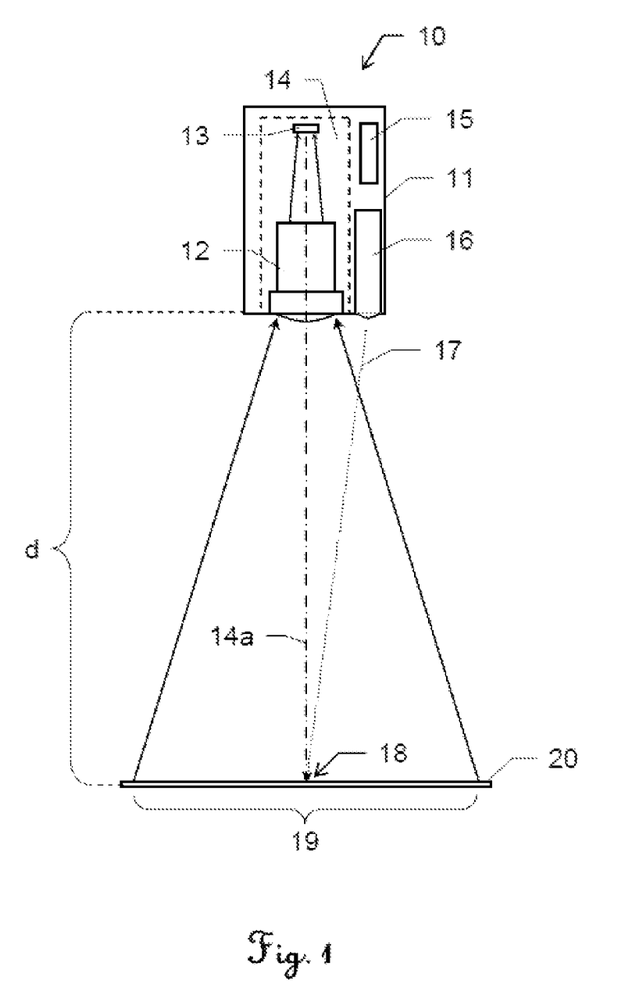
FIG. 1 shows a first embodiment of the image recording device according to the invention.

FIG. 1 shows a first embodiment of an image recording device 10 according to the invention. The image recording device 10 has the form of an image recording device, known, inter alia, as a "visualizer", having a housing 11, which can be mounted on a ceiling, for example.

The image recording device 10 furthermore has a camera 14 having an objective lens 12, which is adjustable in its focal length, and an image sensor 13, for example, a CCD or CMOS sensor. The camera 14 (=optical system 14 having the image sensor 13 and the objective lens 12) defines an optical axis 14a and an image recording region 19, which is defined by the field of vision of the camera 14 or which can be set by means of the objective lens 12. Therefore, using the image recording device 10, images can be captured, which represent the image recording region 19, which is imaged by the objective lens 12 on the image sensor 13; in other words, the image recording region 19 can be captured in an image by means of the camera 14.

The focal length of the objective lens 12 can be set in a controlled manner, manually or by a motor, in particular over a range from f:4 to f:220. Furthermore, according to special embodiments, an image resolution between 1920*1080 and 3840*2160 pixels is achievable by the camera 14.

In addition, a control unit 15 is provided, which is connected both to the optical system 14 and also to a marking unit 16 for controlling or adapting these two components.

The marking unit 16 is implemented for emitting a marking light 17, by means of which an optical light marking 18, for example, a light spot, can be generated on a surface within the image recording region 19. For this purpose, the marking unit has a light source, for example, a laser beam source, in particular a laser diode, and preferably an optic which guides and/or shapes the marking light. By means of this optic, the light can be focused, for example, and the focusing can also be set in an automatically controlled manner. The optical light marking 18 which can be generated can be assigned a defined light incidence region as a subregion of the image recording region 19, whereby also a specific number and grouping of image pixels of the image sensor 13 is known, by means of which this light incidence region is imaged during capture of an image (sub-image pixels).

In particular, the arrangement of the marking unit 16 in relation to the camera 14 and the configuration of the marking unit 16 are known for this purpose, so that the location of a propagation axis of the marking light 17 in relation to the optical axis 14a is also known.

The capture of one or multiple images using the camera 14 is controlled by means of the control unit 15. To capture an image, for this purpose image information is generated and read out using the image sensor 13 offset in time, sequentially, and segmented—i.e., pixel by pixel or pixel group by pixel group (wherein a pixel group only comprises one image pixel, for example). Thus, individual pixel groups are "exposed" offset in time and the exposure information collected in this case is read out subsequently to the "exposure" or during the "exposure". Actual physical exposure (i.e., not solely incidence of light on the sensor) is not to be understood in this case as the exposure of the pixel group, but rather collection of light (information) for a specific time interval, wherein this collection is performed by a corresponding electronic activation of the image sensor 13 by the sensor 13 itself. After the readout of the exposure information, it is erased on the sensor side, whereby renewed collection of new exposure information using the respective pixel groups is enabled.

According to the invention, a consideration of the emitted marking radiation 17 is performed in the scope of the described image capture, so that in a resulting image, which represents the image recording region 19, the light marking 18 generated by the marking radiation 17 is not captured and is not visible. This is achieved by an activation of the marking unit 16 by means of the control unit 15 such that the emission of the marking light 17 is changed or interrupted for the collection of such exposure information, which is to be assigned to at least one part of the light incidence region.

The image pixels of the image sensor 13, which are assigned to at least one light incidence region for the marking light 17 (=sub-image pixels) are known because of the knowledge about the type and location of the generation of the light marking 18. If such a pixel group, of which at least one image pixel corresponds to a sub-image pixel, is reached or activated accordingly for image capture during the chronologically offset collection pixel group by pixel group of the exposure information, the change or interruption of the marking light emission is thus performed adapted thereto, in particular immediately before the collection of the light information using this pixel group and in particular the readout of this pixel group.

The changing, adaptation, or interruption of the emission of the marking light 17 can be implemented, for example, by turning off the light source for a specific time interval (for example, pulsed laser beam source), by deflecting the marking light 17, so that the light marking 18 does not result within the image recording region 19 (during the collection of the exposure information), and/or by attenuating, blanking out, or blocking the marking light 17 (for example, by means of a physical aperture which can be pivoted in a controlled manner into the beam path or by means of an electronically controllable filter unit).

According to the invention, image information is thus progressively collected and read out over the entire capture area of the image sensor 13. Based on these items of information, an image can be generated, which images the entire image recording region 19, wherein the light marking 18 is not captured in the image.

In the exemplary embodiment shown, the optical system and the marking unit 16 are implemented and positioned in relation to one another such that the marking light 17, if a specific distance d is provided between object 20 and image recording device 10, intersects the object 20 with the optical axis 14a and a light spot is generated in this intersection point. The invention is in no way restricted to such an embodiment, however, but rather also comprises embodiments which have an alternative relationship of marking light and optical axis, but preferably such that the light marking 18 which can be generated arises inside the image capture region 19.

Furthermore, according to an alternative embodiment according to the invention (not shown), the marking unit 16 has a beam deflection unit, by means of which the propagation direction of the marking light 17 (optical axis for the marking light) can be set. In particular, an alignment of a marking laser can thus be set in dependence on the distance d, in particular automatically.

Figure 2:
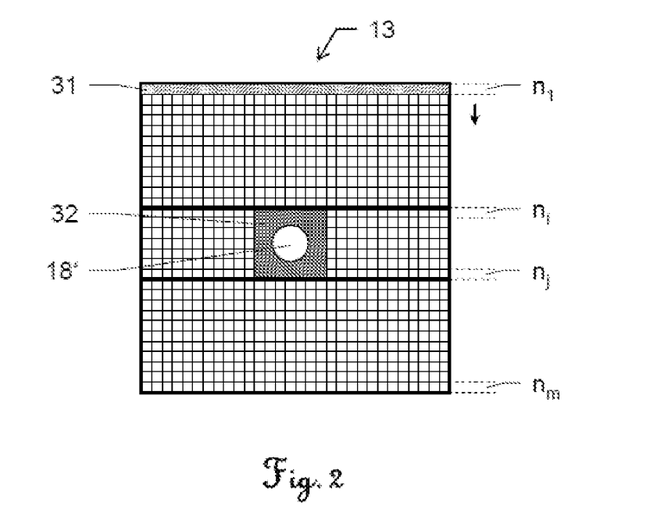
FIG. 2 shows the principle according to the invention of the chronologically offset collection of image information with consideration of a light marking during the image capture on the basis of an image sensor which can be analyzed pixel group by pixel group.

FIG. 2 shows the principle according to the invention of the chronologically offset collection of image information with consideration of a light marking during the image capture on the basis of an image sensor 13 which can be analyzed pixel (group) by pixel (group). The image sensor 13 is implemented as a CMOS sensor.

The capture of an image corresponding to the entire capture area of the sensor 13 is performed in this case by line by line capture and readout of image information. The capture area has $n_m$ sensor lines, wherein each sensor line $n_1$-$n_m$ corresponds to one pixel group. The pixel group 31 which corresponds to the sensor line $n_1$ is shown as an example. For the image capture, the sensor lines $n_1$-$n_m$ are analyzed chronologically offset (for example, successively), i.e., firstly exposure information (image information in the form of light incident on the pixel group or on the line), for example, is first collected in an electronically controlled manner for the line $n_1$ for a specific first exposure time and, beginning chronologically offset thereafter, exposure information for the line $n_2$ is also collected for a specific second exposure time. The exposure times are identical in this case in particular with regard to the respective duration and can chronologically overlap, wherein the beginning of the first exposure time is chronologically before the beginning of the second. The collection of the image information is continued accordingly up to the line $n_m$ and subsequently started again with line $n_1$.

Therefore, image information can be progressively generated by an overlap of the respective exposure times, wherein no chronological gap arises with regard to the image capture.

For the image sensor 13 and its image pixels, a sub-sensor region 32 (corresponding to the light incidence region) having a group of specific sub-image pixels is previously known, by means of which imaging of the light incidence region, which is provided in dependence on the marking light, in the image recording region is performed in the scope of an image capture. The sub-sensor region 32 or the light incidence region is selected or provided such that the light spot 18', which is generated by the light marking 18 and can be captured using the image sensor 13, lies inside this region 32. The sub-sensor region 32 or the light incidence region can be provided in this case so it is dimensioned in particular such that a specific spatial tolerance is provided for the incidence of the light marking 18 or the light spot 18', i.e., the region is then dimensioned larger than the beam cross section of the marking light upon incidence on the object to be imaged.

In the scope of the invention, the image capture using the image sensor 13 is carried out in consideration of the marking light 17 and the light marking 18 thus generated or the light spot 18' which can be captured by the sensor 13. During the line by line image capture—as shown here—for the collection of exposure information for the lines $n_i$-$n_j$, which each comprise a part of the sub-sensor region 32 or the sub-image pixels and using which the light spot 18' (with a specific tolerance range) would be captured during emission of the marking light 17, the marking light emission is therefore adapted (in particular interrupted) such that the light spot is not generated inside the image recording region or is not generated at least partially in a capture region to be assigned to the respective line for the respective exposure time of the lines $n_1$-$n_j$.

In particular, the emission of the marking light 17 is interrupted for the capture of the lines $n_i$-$n_j$ (for example, by adapted pulsing of the marking light emitted as laser light). In particular, the interruption begins immediately before the beginning of the collection of the exposure information of the line $n_i$ and ends after the completion of the collection of the exposure information of the line $n_j$.

A control of the marking unit with respect to the emission of the marking light and a control of the image sensor 13 for the chronologically offset collection and readout of image data is implemented in particular by a control unit integrated in the image recording device.

Figure 3A:
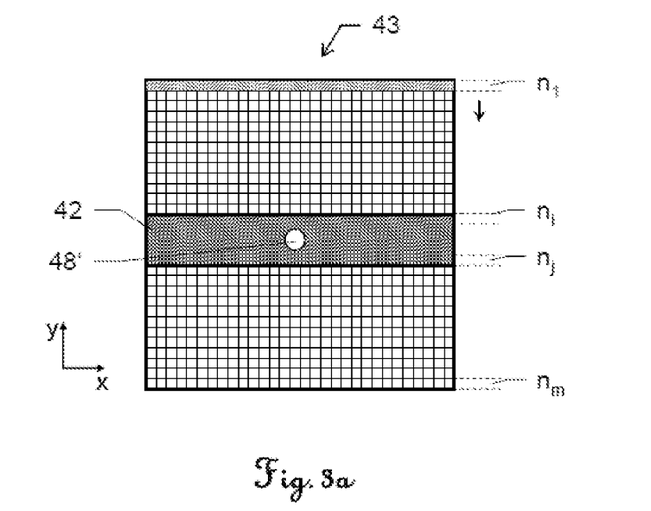
FIGS. 3a-c show an image sensor, a marking light generation, and the consideration of the light marking which can thus be generated during the image capture using the image sensor according to the invention.

By way of a specific dimensioning of the sub-sensor region 32, furthermore an offset of the light marking 18 in relation to the optical axis 14a, which occurs, for example, during a distance change between object 20 and image recording device 10, can be taken into consideration such that the light marking 18 is not captured in the image in spite of such an offset (see FIG. 3a).

FIG. 3a will be described together with FIG. 3b and shows a CMOS sensor 43, which enables line by line capture of exposure information similarly to the image sensor 13 according to FIG. 2. The collection of the exposure information and in particular readout of the collected information is performed chronologically offset line by line (for the sensor lines $n_1$-$n_m$), wherein each sensor line is formed by a pixel group extending in the x direction made of linearly adjacent image pixels. The lines are gradually analyzed with a chronological overlap of respective times for the collection of the light information (one line in the y direction in each case).

For the sensor 43 and its image pixels, a sub-sensor region 42 (corresponding to the light incidence region 49') having a group of specific sub-image pixels is in turn defined. The sub-sensor region 42 extends in the x direction over the entire capture area of the sensor 43 and in the y direction over a region between the lines $n_i$-$n_j$. A light spot 48' due to the light marking 48, which can be captured by the image sensor 43, would be located inside this region 42 and is shown for illustration.

The image capture using the sensor 43 is performed according to the invention by chronologically offset line by line collection of exposure information for each line, wherein the emission of the marking light 47 is controlled such that for the collection of exposure information for the lines $n_i$-$n_j$ (during the exposure of these lines), the emission is changed or interrupted so that the light marking 48 is not generated, is generated in a strongly attenuated manner, or is generated at another position.

Figure 3B:
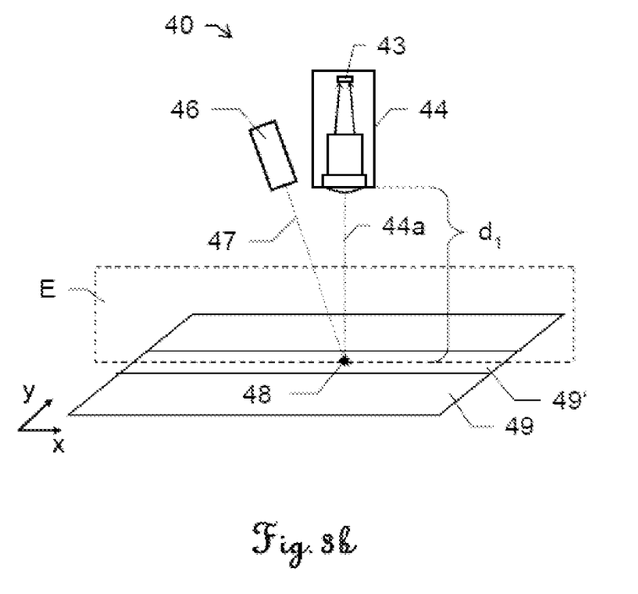

The sensor 43 is adapted for the use in an embodiment according to the invention of the image recording device 40 having camera 44 and marking unit 46 according to FIG. 3b. The camera 44 defines an image recording region 49, which is imaged by means of the objective lens of the camera 44 on the sensor 43. The marking unit 46 is implemented for emitting a marking beam 47, wherein the beam 47 can be emitted such that it lies in a plane E, in which an axis parallel or coaxial to the optical axis 44a of the camera 44 (the optical axis 44a itself here) also lies, i.e., the optical axis 44a and an axis defined by the marking beam 17 intersect.

The marking beam 47 and the laser marking 48 which can thus be generated are assigned a light incidence region 49' as a subregion of the image recording region 49. An intersecting straight line of the plane E and the image recording region 49 extends in this light incidence region 49'. At a specific distance $d_1$ between an object and the image recording device 40, the laser marking 48 arises at a provided position in relation to the recording region 49, in particular at an intersection point of optical axis 44a and image recording region 49.

Figure 3C:
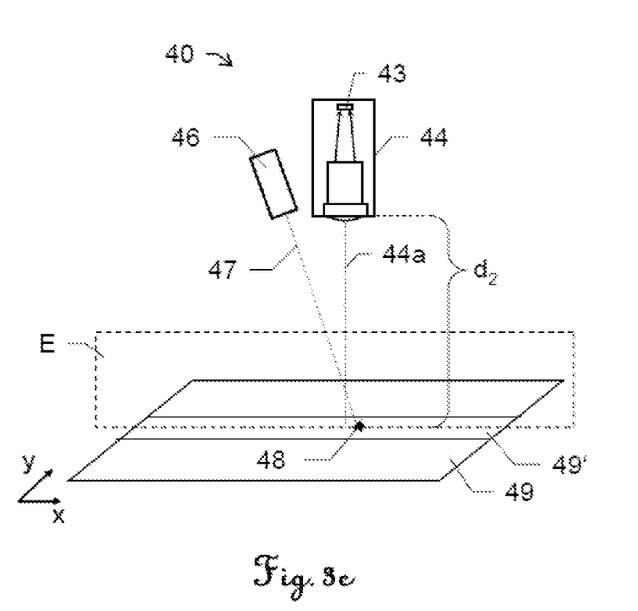

If the distance between the surface of the object to be recorded and image recording device 40 is changed, for example, because of the object thickness, the position of the laser marking 48 thus changes within the light incidence region 49', in particular along the intersection straight line. This is shown as an example in FIG. 3c, wherein a greater distance $d_2$ is present between object and image recording device 40 and the laser marking 48 is thus generated offset in the x direction.

The image sensor 43 is arranged and aligned in the camera 44 of the image recording device 40 so that the x direction of the image recording region 49 corresponds to the x direction of the capture area of the image sensor 43 (this applies similarly for the y direction) and thus image pixels of the sensor 43 can be assigned which correspond to the possible light incidence region 49' and precisely capture this region 49'. The sub-sensor region 42 can therefore be defined corresponding to the light incidence region 49'.

According to an alternative embodiment (not shown here), the marking unit 46 can have a beam deflection unit, by means of which a change of the emission direction of the marking light 47 can be carried out and therefore the position of the light marking 48 can be changed or set. This can be performed depending on the distance to the object. The beam deflection unit can have for this purpose optical elements of the type in question, for example, mirrors or prisms.

Figure 4:
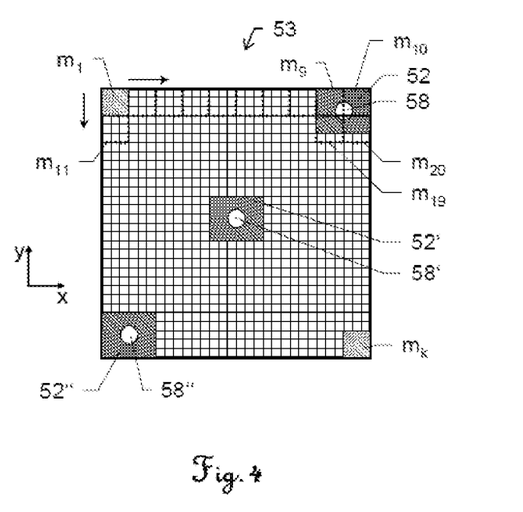
FIG. 4 shows the principle of the image recording method according to the invention using an image sensor.

FIG. 4 shows a principle of an image recording method according to the invention for an image recording device having an image sensor 53 according to the invention.

The capture area of the sensor 53 again has a plurality of image pixels for capturing an image. Within this capture area, marking light capture areas 52-52" are additionally defined as subareas, to each of which a specific group of sub-image pixels from the plurality of the image pixels is assigned. The light markings, which can be generated by a marking unit on an object to be recorded or on a support surface, can be generated, inside an image capture region defined by the image recording device, so that they would be captured during operation of the image recording device (and therefore the marking unit) having the image sensor 53 inside the marking light capture regions 52-52" as corresponding light spots 58-58". The light markings are used by a user of the image recording device as orientation aids for the placement of an object to be recorded, so that it can be recorded as an image in the desired manner.

The light markings can be generated for this purpose, for example, by a single beam source and splitting of the emitted light, in particular by means of a beam splitter, into three (or more) partial light beams or, for example, by means of three beam sources, in particular laser diodes.

Image capture according to the invention is performed using the sensor 53 by segmented and chronologically offset collection of image information by different pixel groups $m_1$-$m_k$. The collection of the exposure information is performed in this case, in contrast to the sensors according to FIGS. 2 and 3a, not line by line (the individual pixel groups do not correspond to the image pixels of one sensor line in each case), but rather correspond to the defined pixel groups $m_1$-$m_k$ "regionally" (pixel group by pixel group). The pixel groups $m_1$-$m_k$ each comprise image pixels in this case, which each form a subarea of the overall capture area.

Therefore, the pixel groups $m_1$-$m_k$ are successively activated to collect the exposure information. For example, firstly the pixel group $m_1$ is activated such that this group of pixels $m_1$ is exposed (the exposure is performed by an electronic activation of the respective image pixels and is not to be understood of in this context as actual illumination of the pixels—the illumination of the pixels can already begin earlier chronologically, for example, and last longer or also take place continuously). The pixel groups $m_2$-$m_8$ are then accordingly exposed chronologically offset to the group $m_1$ and chronologically offset among one another in each case.

For the times of the exposure of the groups $m_9$-$m_{10}$, an activation of the marking unit is performed such that the light marking is not captured by the marking light capture region 52. The light marking is, for example, turned off or deflected for the duration of the exposure of the groups $m_9$-$m_{10}$. For the exposure of the subsequent pixel group $m_{11}$, the light marking can be activated again. In general, this means that the respective light marking is adapted, i.e., in particular interrupted, for the collection of exposure information using those pixel groups $m_9$-$m_{10}$, $m_{19}$-$m_{20}$ which have at least one pixel of a marking light capture region 52-52". In contrast, the light marking can be activated for the exposure of the remaining groups.

It is obvious that the invention is not restricted to an embodiment of the pixel groups as shown (FIGS. 2, 3a, and 4), but rather comprises embodiments having alternatively defined pixel groups, for example, pixel groups which correspond to respective sensor columns and are exposed column by column, or pixel groups which only comprise a single image pixel (which corresponds to a pixel by pixel collection of exposure information).

In addition, pixel groups of different size, i.e., with respect to the respective number and/or configuration of image pixels, can be defined in the scope of the invention. For example, the pixel groups $m_1$-$m_8$ or $m_1$-$m_8$ and $m_{11}$-$m_{18}$ can be activated according to FIG. 4 as a first group and the groups $m_9$-$m_{10}$ or $m_9$-$m_{10}$ and $m_{19}$-$m_{20}$ can form a second group.

Furthermore, it is apparent that chronologically offset exposure of the pixel groups, i.e., the collection of the exposure information using the individual pixel groups, can be performed repeatedly, so that the exposure of the "first" pixel group ($m_1$, $n_1$) follows the exposure of the "last" pixel group ($m_k$, $n_m$) of the capture region in a chronologically offset manner. A progressive image capture and image generation is thus possible corresponding to the overall capture region. In particular, this is performed at a frequency of at least 30-60 FPS (frames per second).

FIGS. 5a-e show respective image recording regions 69 of specific embodiments of image recording devices according to the invention having respective light incidence regions 69'-69"", wherein the respective light markings 68, which can be generated by provided marking units, are generated inside the assigned light incidence regions 69'-69"".

Figure 5A:
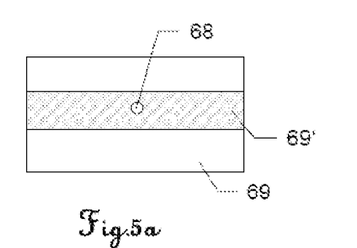
FIGS. 5a-e show respective image recording regions of specific embodiments of image recording devices according to the invention having respective light incidence regions.
Figure 5B:
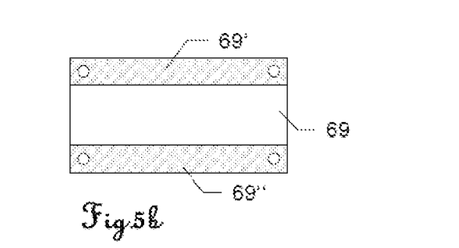
Figure 5C:
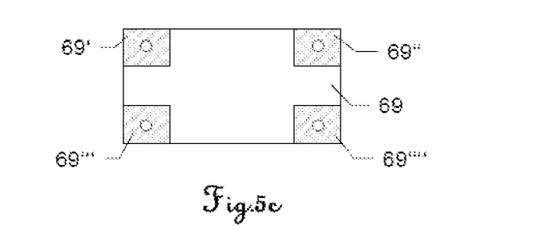
Figure 5D:
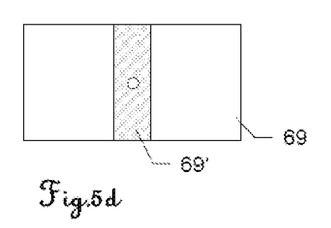
Figure 5E:
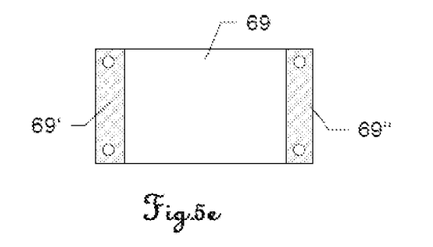

The light incidence regions 69'-69"" are each defined so that efficient image capture can be carried out using the respective image sensor, which can be exposed and read out pixel by pixel. Especially, the regions 69'-69" of FIGS. 5a and 5b are therefore provided for a line by line exposure and readout, the regions 69'-69"" of FIG. 5c are provided for a region by region (in subareas) exposure and read out, and the regions 69'-69" of FIGS. 5d and 5e are provided for a column by column exposure and readout.

According to alternative embodiments according to the invention (not shown), the light marking can be generated, for example, in the form of a line or a desired pattern.

Figure 6:
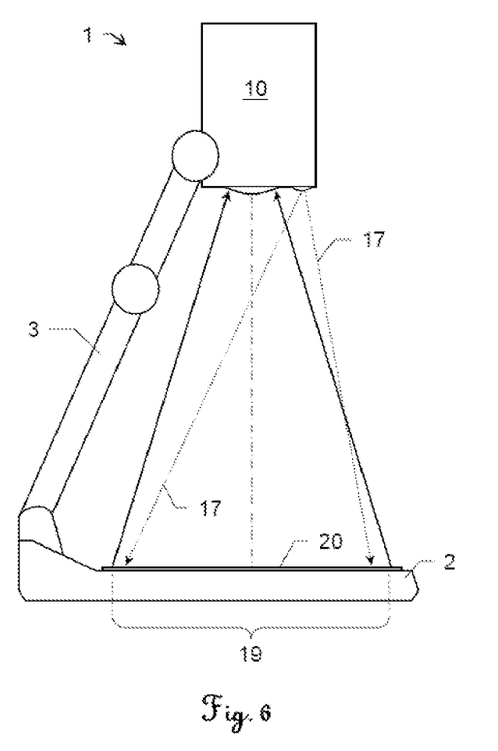
FIG. 6 shows a device for visualizing an object using an image recording device according to the invention.

FIG. 6 shows a device 1 according to the invention for visualizing an object 20 having an image recording device 10 having an essentially flat, horizontal support surface 2, on which the object 20, in the form of a flat image plate here, can be placed. An articulated arm 3 extends above the support surface 2, which connects the support surface 2 to an image recording device 10 and by means of which the image recording device 10 can be aligned in relation to the support surface 2.

By means of such a device 1, the part of the object 20, which lies inside the image recording region 19 defined by the image recording device 10, can be imaged in an image. The image recording region 19 can be set in particular by a zoom objective lens of the image recording device 10 or a change of the distance between the image recording device 10 and the support surface 2.

It is obvious that these illustrated figures only schematically illustrate possible exemplary embodiments. The various approaches can also be combined according to the invention with one another and with methods for visualizing (image capture) objects and with image recording devices, such as a "visualizer", of the prior art.

The invention claimed is:

1. An image recording method for image capture using an image recording device, comprising:
   wherein the image recording device has a camera having an image sensor and an objective lens,
   wherein the camera defines an image recording region, which can be captured in an image and can be set at least by means of the objective lens and the image sensor has a capture area having a plurality of image pixels for image capture and the image pixels can be activated and read out in pixel groups, and a marking unit having a light source for emitting marking light, wherein an emission of the marking light is performed such that a visually perceptible light marking is generated inside the image recording region, and an image capture of the image recording region is performed by means of the camera, wherein the emission of the marking light is performed in a predetermined manner, such that the light marking is generated within an initially known light incidence region, the light incidence region forming a subregion of the image recording region and being known based on a known configuration of the marking unit and a known arrangement of the marking unit in relation to the camera such that the light incidence region can be captured by a subset of initially known sub-image pixels from the plurality of image pixels, wherein the image capture is performed using chronologically offset collection, pixel group by pixel group, of exposure information, wherein the emission of the marking light is adapted for the collection of the exposure information of the subset of sub-image pixels capturing the light incidence region, which comprises at least one sub-image pixel, whereas generation of the light marking inside the image recording region is activated for the collection of the exposure information of the remaining image pixels, and wherein image information is progressively collected and read out, and an image is generated, which images the entire image recording region, wherein the marking light is not captured in the image.

2. The image recording method according to claim 1, wherein, for each pixel group, a specific exposure time is defined and the collection of the exposure information is performed in the scope of the respective exposure time, in particular wherein the collection of the exposure information is performed pixel group by pixel group, successively with chronologically successive exposure times and/or pixel group by pixel group, chronologically overlapping with overlapping exposure times.

3. The image recording method according to claim 1, wherein the collection of the exposure information and a readout of the exposure information collected in each case for respective pixel groups is performed within a shared time window, in particular simultaneously, in particular wherein the exposure information is collected during the readout, or is performed chronologically offset, in particular chronologically adapted to one another, in particular synchronized.

4. Image recording method according to claim 1, wherein the pixel groups each represent a sub-area of adjacent image pixels of the capture area.

5. The image recording method according to claim 1, wherein the pixel groups each represent a linear sequence of adjacent image pixels, in particular wherein each pixel group corresponds to at least one sensor line or at least one sensor column of the capture area.

6. The image recording method according to claim 1, wherein the light incidence region is defined such that the area of the light incidence region comprises between 5% and 60% of the area of the image recording region, wherein the sub-image pixels have between 5% and 60% of the image pixels of the capture area.

7. The image recording method according to claim 1, wherein the emission of the marking light is performed such that the light marking is generated as at least one light spot, in particular in the center of the image recording region, and/or as a light pattern.

8. The image recording method according to claim 1, wherein, during the capture of the image recording region, a distance is provided between the objective lens and an object to be captured of 0.3 m to 15 m, wherein a focusing of the marking light is automatically tracked in dependence on the distance and/or an emission direction of the marking light is adapted in dependence on the distance, such that the light marking is progressively generated at an intersection point of the optical axis of the camera with the image recording region.

9. The image recording method according to claim 1, wherein the capture of the image recording region is performed repeatedly at a specific frequency, wherein the collection of the exposure information for the respective pixel groups is performed in each case at the specific frequency, wherein the image recording region or the pixel groups are captured or read out 10-1000 times per second.

10. The image recording method according to claim 1, wherein the emission and/or the adaptation of the emission of the marking light is performed in a manner adapted to the collection of the exposure information for the pixel groups which comprise at least one sub-image pixel, in particular wherein the emission is performed in a pulsed manner, the light source is turned off sequentially, and/or the emission of the marking light is blocked or deflected.

11. An image recording device for capturing an image, comprising:

a camera having an image sensor and an objective lens, wherein the camera defines an image recording region, which can be captured in an image and can be set at least by means of the objective lens and the image sensor has a capture area having a plurality of image pixels for image capture and the image pixels can be activated and read out in pixel groups, and a marking unit having a light source for generating a visually perceptible light marking inside the image recording region by means of emission of marking light, wherein the marking unit has a known configuration and a known arrangement in relation to the camera such that the light marking which can be generated is assigned to at least one initially known light incidence region in the recording region, and the light incidence region can be captured by a subset of initially known sub-image pixels from the plurality of image pixels, and wherein the image recording device provides a defined image capture mode and the image recording region can be captured in an image using a successive collection, pixel group by pixel group, of exposure information in a controlled manner such that for the collection of the exposure information of the subset of sub-image pixels capturing the light incidence region, which comprises at least one sub-image pixel, the light marking which can be generated can be interrupted, whereas generation of the light marking inside the image recording region is uninterrupted for the collection of the exposure information of the remaining image pixels, so that by executing the image capture mode, in a manner controlled by a control unit of the image recording device, exposure information is progressively collected and read out, wherein the read out image recording region is free of the light marking.

12. The image recording device according to claim 11, wherein
the marking unit is implemented and arranged such that a propagation axis of the emitted marking light lies in a plane, which is defined by an axis, which is parallel, in particular coaxial to the optical axis of the camera, and intersects the light incidence region, and by a readout direction for the readout of the pixel groups, in particular by an extension direction of sensor lines or sensor columns of the capture area of the image sensor, or
the marking unit and the camera are implemented and arranged such that the marking light which can be emitted is coupled into the beam path of the camera.

13. The image recording device according to claim 11, wherein the image recording device has multiple image sensors and in particular multiple objective lenses, wherein the image recording region can be captured by means of the multiple image sensors and one of the pixel groups is formed at least by one subregion of one of the multiple image sensors, in particular by at least one of the multiple image sensors.

14. The image recording device according to claim 11, wherein
the marking unit has
  a settable beam-focusing optic for focusing the marking light and/or
  settable beam deflection means for adapting an emission direction of the marking light,
in particular in dependence on a distance between the camera and an object to be captured, and/or
the marking unit has at least one of the following components:
  a laser unit based on a microsystem (MEMS),
  a projection element having a DLP element (digital light processing) and/or a DMD element (digital micromirror device) and/or an LCOS element (liquid crystal on silicon), and/or
  a thin-film transistor (TFT) or a liquid crystal display (LCD), and/or
the light source is implemented as a laser beam source, in particular a laser diode, in particular wherein the marking unit has two or more light sources.

15. A non-transitory machine-readable carrier for controlling or executing a method according to claim 1 when a computer program product stored on the non-transitory machine readable carrier is executed by means of a control unit of an image recording device.

* * * * *

UNITED STATES PATENT AND TRADEMARK OFFICE
CERTIFICATE OF CORRECTION

PATENT NO. : 9,706,129 B2  
APPLICATION NO. : 14/609837  
DATED : July 11, 2017  
INVENTOR(S) : Clemens Kresser Page 1 of 1

It is certified that error appears in the above-identified patent and that said Letters Patent is hereby corrected as shown below:

On the Title Page

Column 1  
Change from:  
(71) Applicant: WolfVision Innovation GmbH, Klaus (AT)  
To:  
(71) Applicant: WolfVision GmbH, Klaus (AT)

Signed and Sealed this  
Twenty-sixth Day of February, 2019

Andrei Iancu  
*Director of the United States Patent and Trademark Office*